April 17, 1934.  R. G. THOMPSON ET AL  1,955,614
TYPEWRITING MACHINE
Filed March 18, 1931   3 Sheets-Sheet 2
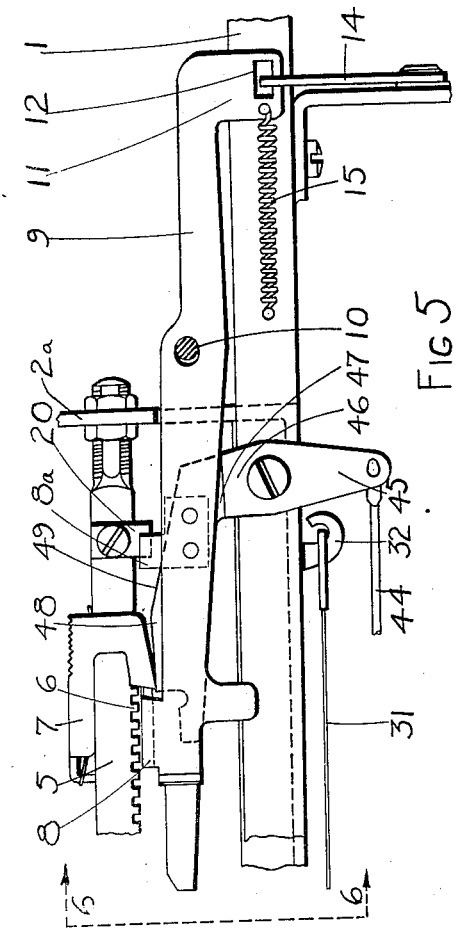
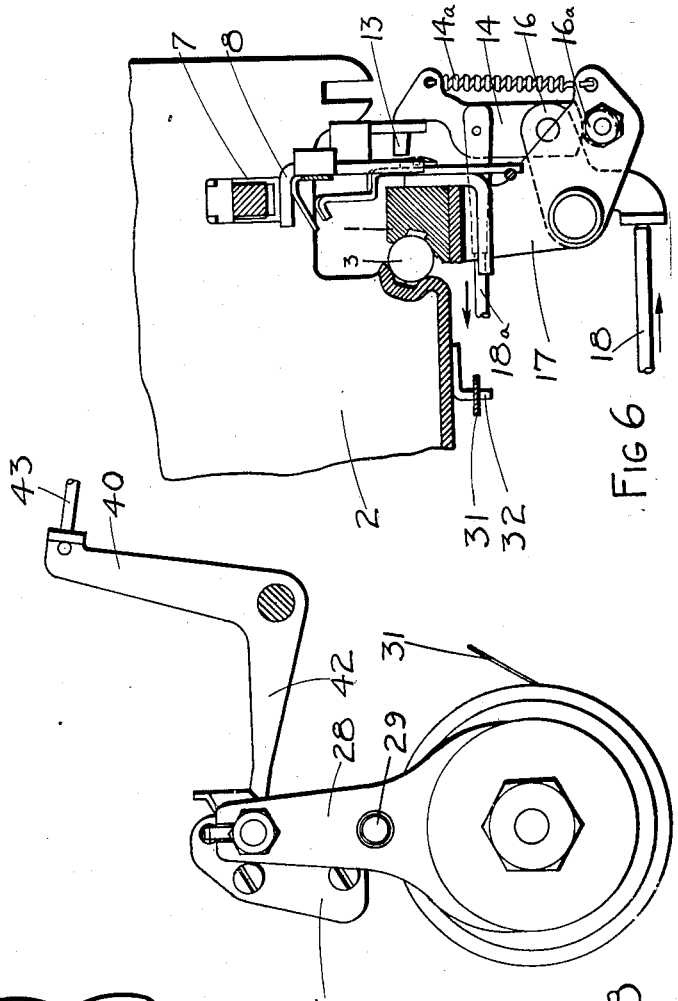
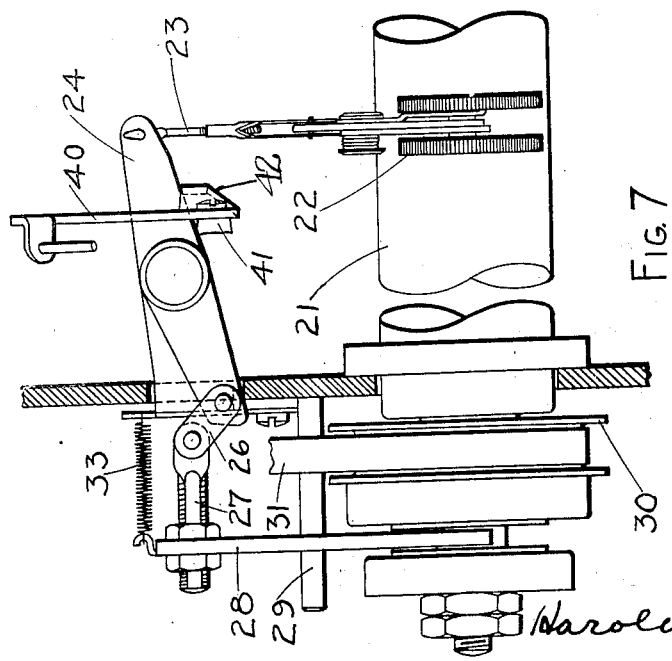
INVENTORS
RUSSELL G. THOMPSON
CHESTER W. CRUMRINE
BY Harold E. Stonebraker
ATTORNEY April 17, 1934. R. G. THOMPSON ET AL 1,955,614
TYPEWRITING MACHINE
Filed March 18, 1931   3 Sheets-Sheet 3

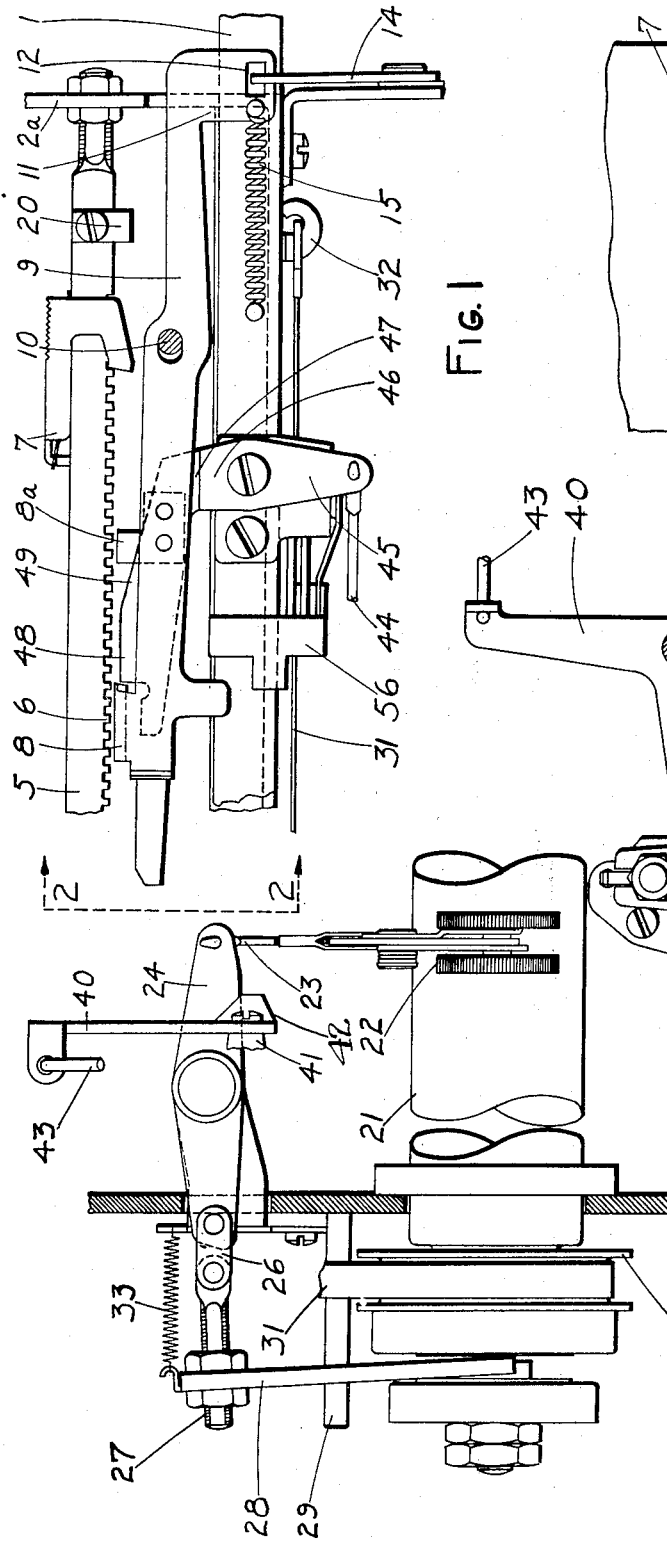

INVENTORS
RUSSELL G. THOMPSON
CHESTER W. CRUMRINE
BY Harold E. Stonebraker
ATTORNEY Patented Apr. 17, 1934

1,955,614

UNITED STATES PATENT OFFICE 1,955,614

TYPEWRITING MACHINE

Russell G. Thompson and Chester W. Crumrine, Rochester, N. Y., assignors to Electromatic Typewriters, Inc., Rochester, N. Y., a corporation of New York Application March 18, 1931, Serial No. 523,480

18 Claims. (Cl. 197—65)

This invention relates to improvements in typewriting machines, and particularly to devices for returning the carriage to begin a new line of writing.

The invention is shown applied to a well known power operated typewriting machine for which it is particularly adapted, although it might be readily applied to other types of machines. In the past, considerable difficulty has been experienced in eliminating the noise caused by the shock of impact of the marginal stop devices when the carriage of a typewriting machine is returned by mechanical means or power actuated devices, and the principal object of this invention is the provision of means for returning the carriage in power operated typewriting machines which eliminates the noise usually produced by such carriage return.

Another object of the invention is the provision of means for releasing the carriage return devices from their actuating means before the margin stops move into engagement with each other so that the carriage moving under the action of inertia and against the tension of its spring motor toward the margin stop gradually slows up until it strikes the stop with a very light substantially noiseless blow.

More specifically, the object of the invention is the provision of a device in the path of the movable margin stop for releasing the carriage return devices from driving connection with the carriage before said stop engages the fixed stop.

Still another object of the invention is to provide means in a power driven typewriting machine for disengaging the escapement devices when the carriage is being returned for beginning a new line and reengaging said devices as the carriage approaches the limit of its return movement and before the engagement of the margin stops to limit its movement, so that the noise caused by the escapement devices during the return movement of the carriage is avoided.

To these and other ends, the invention consists in the construction and arrangement of parts that will appear from the following description when read in conjunction with the accompanying drawings, the novel features being pointed out in the claims at the end of the specification.

In the drawings:

Fig. 1 is a fragmentary rear elevation of a typewriting machine showing carriage return and marginal stop devices at one end of the carriage and illustrating one embodiment of the invention;

Fig. 2 is a sectional view taken substantially on line 2—2 of Fig. 1 and looking in the direction of the arrow at said line;

Fig. 3 is a fragmentary rear elevation of the power devices for controlling and driving the carriage return mechanism;

Fig. 4 is an end elevation of the same;

Fig. 5 is a view similar to Fig. 1 showing the carriage in another position;

Fig. 6 is a section on line 6—6 of Fig. 5, looking in the direction of the arrow at said line;

Fig. 7 is a view similar to Fig. 3 but showing the parts moved to another position;

Fig. 8 is an end elevation of the same;

Figure 9:
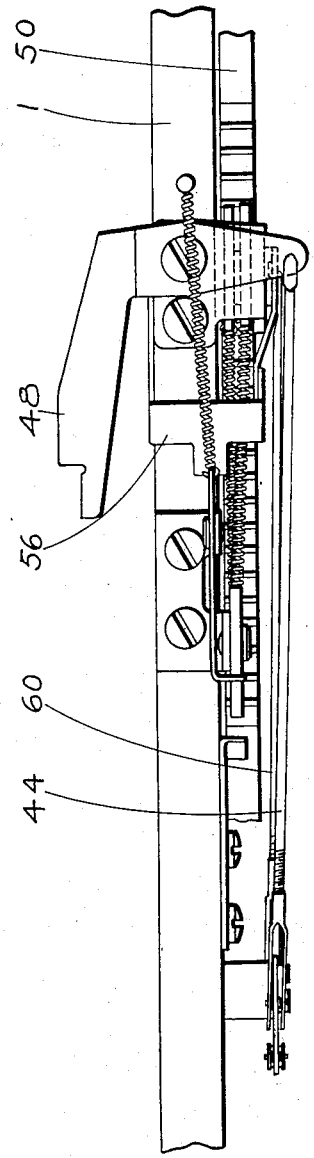
Fig. 9 is a fragmentary rear elevation illustrating an arrangement of devices for withdrawing the escapement pawls from the rack while the carriage is being returned.

Referring specifically to the drawings, in which like reference numerals refer to the same part in all the views, 1 is a fixed part of the frame of the machine on which a carriage 2 is mounted on rollers 3 for transverse movement for letter and word spacing. The movement of the carriage is effected by means of a spring drum and controlled by escapement devices of any usual or preferred construction old and well known in the art and forming no part of this invention.

Mounted in the carriage and extending across the same is a bar 5, having rack teeth 6 along one edge thereof which are resiliently engaged by margin stops 7 adjustably mounted on the rod. It will be understood that two of the stops 7 may be employed, one adjacent each end of the carriage, although only one of them is shown herein. The margin stops 7 cooperate with opposite sides of a fixed or stationary stop 8 mounted on a fixed part of the machine and limit the movement of the carriage in opposite directions.

The stop 8 is carried on a lever 9 pivoted at 10 on a fixed part of the machine and arranged in the path of the margin stops 7. The lever 9 is arranged in the general direction of the movement of the carriage, and at the left hand side of the machine, the right hand side as seen from the rear in Fig. 1. It has a downwardly projecting portion 11 at the side of the machine provided with an elongated slot 12 engaged by a lug 13, Figs. 2 and 6, projecting forwardly from the upper end of an arm 14. The pivot 10 also engages an elongated opening in the stop lever 9 which is resiliently held in the normal position shown in the drawings by means of a spring 15 connected at one end to the end of the lever and anchored at its other end to the frame of the machine. By this arrangement, the stop lever has a limited movement against the tension of the spring in the direction of the movement of the carriage when engaged by the margin or line stop 7 at the other end of the carriage, or the tabular stops on the carriage adapted to also cooperate with the stop lever, but forms no part of the present invention.

The arm 14 is pivoted at its lower end on one arm of a bell crank lever 16 pivotally mounted on a bracket 17 secured to the machine frame. The other end of the bell crank lever 16 has a link 18 connected thereto which is operatively connected with the usual margin release key, not shown. When the margin release key is depressed, the bell crank 16 is turned in a counter-clockwise direction, as seen in Figs. 2 and 6, which has the effect of depressing the left hand end of the stop lever 9 and moving its stop 8 out of the path of the margin stop 7 to permit the carriage to move a greater distance to the left to begin the line nearer the left hand margin of the sheet. A second stop 20 is fixedly mounted on the rod 5 adjacent the end of the carriage and is arranged to engage the arm 48 to disengage the clutch if the carriage return key is pressed after the margin stop 7 has passed stop 8 on lever 9. A second stop 8a may be secured to the stop lever 9 in advance of the stop 8 and arranged out of the path of the stops 7 and 20 but adapted to be engaged by the end plate 2a of the carriage to limit its extreme movement in carriage return direction. A spring 14a connects the lever 14 with the bracket 17 and resiliently retains the parts in normal position, with the lower end of the lever 14 in engagement with a stop 16a on the bracket 17. If desired, the stop 16a may be made adjustable to vary the normal position of the lever 9. The lever 14 is also connected with the tabulating key by means of the link 18a, which link serves to retain the lever 14 in operative engagement with the lever 9 against the action of the spring 14a.

Key controlled power driven devices are provided for returning the carriage against the action of its spring drum to begin a new line. Said devices comprise a roller 21 continuously rotated by power means, such as an electric motor, not shown. Cooperating with the surface of the roller 21 is a key controlled cam 22 of usual or well known construction which is operatively connected, by means of a link 23, with one end of a toggle lever 24 pivotally mounted on a bracket 25 fixed on the frame of the machine. The toggle lever 24 projects outwardly through an elongated opening in the frame of the machine, and at its outer end is pivotally connected to one end of a toggle link 26, the other end of which is pivotally connected to a rod 27 adjustably mounted in the upper end of a yoke 28 loosely pivoted on a rod 29 projecting outwardly from the frame of the machine.

Normally the parts are in the inoperative position shown in Fig. 7 of the drawings, but when the carriage return key is depressed, the cam is moved into engagement with the power roller 21, and is actuated to move the toggle lever from the Fig. 7 position in which the toggle is broken to the straightened position shown in Fig. 3, and the upper end of the yoke 28 inclined outwardly on the rod 29. Mounted on the axle of the roller 21 and freely rotatable thereon is a spool 30 on which a tape 31 is wound. One end of the tape 31 is secured to the core of the spool and the other end is passed over a suitable pulley, not shown, but arranged on the frame at one end of the carriage guideway and at its other end is engaged with a hook 32 projecting from the carriage. A spring drum in the spool 30 tends to rotate it in a direction to wind the tape thereon and keeps the tape taut. A clutch member is mounted on the axle of the roller to rotate therewith and is movable axially thereon into engagement with the spool to connect it with the axle to be driven thereby. Said clutch member is arranged adjacent the lower end of the yoke 28 and moved thereby into engagement with the spool when the parts are moved to straighten the toggle, and the spool is turned to wind the tape thereon and return the carriage to begin a new line. When the toggle is again broken, as shown in Fig. 7, the yoke 28 is returned to normal position by the spring 33 which resiliently connects the upper end of the yoke with a fixed part of the machine, and the spool 30 is again disconnected from driving connection with the power driven devices. The construction of this clutch is clearly shown in Patent No. 1,753,450, granted April 8, 1930, to Russell G. Thompson, and further detailed description thereof is deemed unnecessary here.

Due to the fact that the carriage is returned with considerable speed when moved by the power driven devices, the margin stop engages the fixed stop 8 with considerable impact, causing noise and sometimes disarranging the work sheets on the platen, particularly when a plurality of sheets with carbons between them are arranged thereon. It is desirable to reduce the force of this impact to a minimum, thus eliminating the noise and strain resulting therefrom. To this end, a bell crank lever 40 is mounted on a bracket 41 projecting inwardly from the frame of the machine and has an arm 42 projecting under and in engagement with the toggle lever 24. The other arm of this bell crank lever is operatively connected by means of the links 43 and 44 with one arm 45 of a trip lever pivotally mounted on the rear side of the machine frame adjacent the carriage bed. The other arm 46 of the trip lever extends upwardly and is offset forwardly at 47 to the front of the stop lever 9 and is then extended to the right or to the left, as seen from the rear in the drawings, to provide an arm 48 arranged in a plane substantially parallel to the plane of the stop lever 9, and closely adjacent the stop lever so as to project into the path of the margin stop. The upper edge of the arm 48 is cut away at its right hand end to form an upwardly inclined camming surface 49, which is engaged by the margin stop 7 when the carriage is returned or moved to the left for beginning a new line. By an inspection of Figs. 1 and 5, it will be seen that the camming surface is arranged to the right of the stop 8, as seen in the drawings, so that the margin stop engages the camming surface 49 before it moves into engagement with the stop 8.

By this arrangement, when the toggle lever is actuated to return the carriage, the left hand end of the trip lever is further projected into the path of the margin stop 7 which engages the cam surface 49 before it reaches the limit of its movement, and swings the arm 48 downwardly and the arm 45 to the right, as seen in the drawings, and the bell crank lever 40 in a clockwise direction, as seen in Figs. 4 and 8, which in turn swings the toggle lever 24 from the position shown in Fig. 3 to the position shown in Fig. 7 to break the toggle and release the clutch. When the clutch is released, the tape 31 is disconnected from its driving connection with the power roller and is no longer operative to move or drive the carriage. During its initial movement, however, the carriage has acquired sufficient momentum to move its margin stop 7 into engagement with the stationary stop 8 against the action of the carriage motor. The action of the carriage motor serves to quickly and gradually reduce the momentum of the carriage which may be nearly zero at the time when the margin stop comes into engagement with the stationary stop. The proper distance of the cam 49 from the stationary stop 8 may vary some in different machines, since it is dependent on the weight of the carriage and the strength of the carriage motor. A heavy carriage acquires greater momentum than a lighter one, and hence will move a greater distance under the force of momentum. A strong carriage motor reduces the force of momentum more rapidly and hence requires less distance. A heavy carriage has a tendency to reduce the speed of the driving motor more than a lighter one, and hence acquires somewhat less momentum in proportion to weight, and also requires a heavier carriage spring. These factors tend to reduce the distance required so that in practice very little or no change from a standard equipment is required for a heavy carriage.

Figure 10:
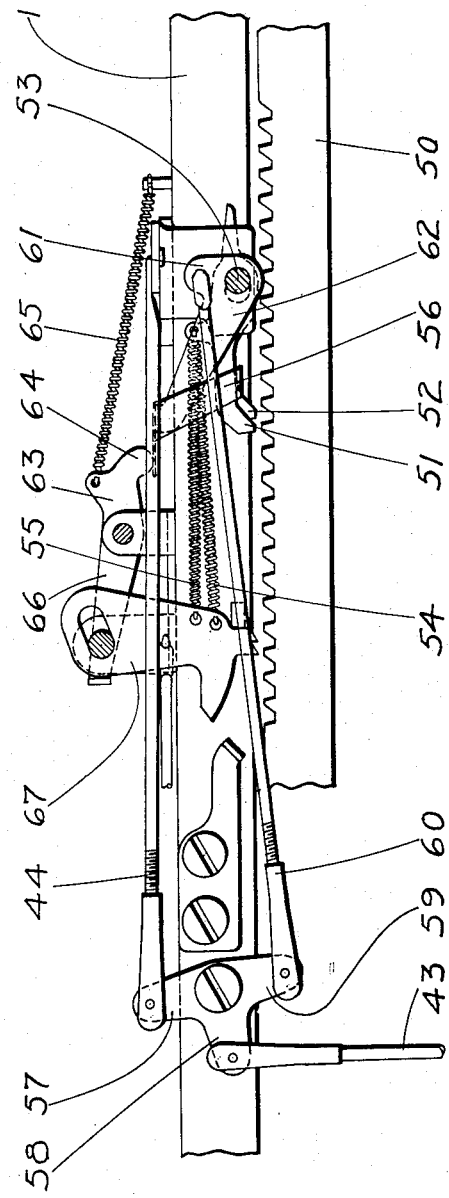
Fig. 10 is an inverted plan view of the same.
Figure 11:
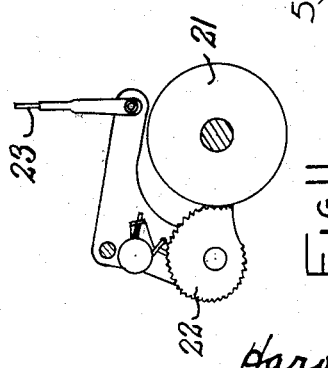
Fig. 11 is a side view of the cam mechanism corresponding to Fig. 3.

Referring to Figs. 9 and 10, a ratchet 50 in the form of a rack is mounted on the carriage and engaged by the escapement pawls 51 and 52 pivoted at 53 on the frame of the machine. The pivot 53 is arranged in elongated openings in the pawls so that the pawls have a limited sliding movement thereon. Springs 54 and 55 connect the pawls with a relatively fixed part and resiliently tend to move the pawls forwardly over the rack and to swing them into engagement therewith. Pivoted on the frame rail 1 is a lever 56 which extends downwardly from the rear of said rail and forwardly under the rail and upwardly between the pawls and the rack 50 so that when the lever is swung rearwardly it engages the pawls and lifts them out of engagement with the rack, as shown in Fig. 10, against the tension of their springs.

Means controlled automatically by the carriage return devices are provided for swinging the lever 56 to pull the pawls out of the rack and retain them out of engagement with the rack during the carriage return movement and release them into reengagement with the rack before the carriage comes to rest or before it engages the margin stop. To this end, the link 44 is connected to the arm 57 of a three-armed lever pivoted on the frame and having an arm 58 to which one end of the link 43 is pivoted. The other arm 59 of the lever is pivotally connected with one end of a link 60, the other end of which is pivoted to an arm 61 of a lever also pivoted at 53 on the frame of the machine. Said lever has another arm 62 which extends rearwardly and to the left, as seen in Fig. 10 of the drawings, and at its free end engages the lever 56 and swings it rearwardly to withdraw the pawls from the ratchet.

The lever 56 is held in normal position by a lever 63 having an arm 64 arranged in the path of the lever 56 and resiliently engaged with said lever by means of a spring 65. The other arm 66 of the lever 63 is arranged to engage a back-spacing dog 67 and lock it against actuation when the pawls 51 and 52 are withdrawn from the rack 50.

When the carriage return devices are actuated to straighten the toggle, a pull is exerted on the link 43 which swings the three-armed lever in a counterclockwise direction, as seen in Fig. 10. This causes a pull to be exerted on the link 44 to swing the arm 48 of the trip lever into the path of the margin stop 7. Simultaneously a push is exerted on the link 60 which is effective to swing the lever 61 in a clockwise direction against the tension of the spring 65, as seen in Fig. 10, to withdraw the pawls from the rack and also to swing the arm 66 to lock the back-spacing dog. It will be understood that the parts will be locked in the position shown in Fig. 10 while the toggle is straightened to the position shown in Fig. 3 to return the carriage. When, however, the arm 48 is engaged by the margin stop, it swings on its pivot and exerts a pull on the link 44 which is effective to swing the three-armed lever in a clockwise direction, as seen in Fig. 10, and pull the link 43 to actuate the lever 40 to break the toggle. Simultaneously a pull is exerted on the link 60 to swing the lever 61 and its arm 62 away from the lever 56 and permit the pawls to move into reengagement with the ratchet under the action of the springs. Since the arm 48 is engaged by the margin stop 7 before said stop engages the stop 8, the pawls are freed to reengage the rack slightly in advance of the engagement of the stops or before the carriage comes entirely to rest at the end of its return movement.

When it is desired to return the carriage to begin a new line of writing, the proper key is depressed, which serves to engage the cam 22 with the power driven roller 21. The cams 22 rotate to swing the toggle lever 24 to close the clutch to connect the tape with the power roller and simultaneously swings the trip lever to project its cam surface 49 into the path of the margin stop 7. As the carriage is driven to the left, as seen in the drawings, it gradually acquires momentum until the stop 7 engages the cam surface 49 and swings the trip lever and through it the bell crank lever 40 to break the toggle and disconnect the spool 30 from its driving connection with the roller 21. The carriage, however, continues to move under the action of its acquired momentum against the resiliency of the carriage spring, gradually slowing up until the stop 7 moves into engagement with the stationary stop 8, and the movement of the carriage is arrested thereby. By properly constructing the relative proportion of the parts and strength of the springs, the momentum of the carriage may be reduced to nearly zero at the time when the stop 7 engages the stop 8, and the noise and jar caused by the interengagement of the parts, when the driving means moves the parts entirely into engagement, is eliminated.

It will be noted that each of the links 44 and 60 is made in two parts threaded together, so that one part may be adjusted relatively to the other to vary the length of the link. By this arrangement, the height to which the arm 48 is elevated when the clutch is closed to return the carriage is varied, and the point in the travel of the carriage at which the stop 7 engages the inclined cam portion 49 of the arm is also varied so that the distance through which the carriage coasts as it were under the force of momentum can be varied until the speed of the carriage is nearly zero at the time when it engages the stop 8. Also by adjusting the length of the link 60, the extent to which the escapement pawls are moved thereby from the rack may be varied as well as its normal position to insure full engagement of the rack by the pawls.

Another important advantage of the arrangement shown herein lies in the fact that the return movement of the carriage imposes an extra load on the motor which has a tendency to reduce its speed and consequently the speed of the power driven roller 21. If a type bar were actuated at the time when the roller was operating at this reduced speed, a fainter impression would be made than when the roller was being driven at normal speed, and by disconnecting the carriage from driving connection with the power driven devices, before it comes to rest, the motor has an opportunity to recover its normal speed before the type bars are actuated to start the new line.

Although only one embodiment of the invention is shown and described herein, it will be understood that this application is intended to cover such changes or modifications as come within the spirit of the invention or scope of the following claims.

We claim:

1. In a typewriting machine, the combination of a frame, a carriage movable transversely on the frame, means for moving the carriage for letter spacing, a power driven roller, key controlled means operated by the power driven roller for moving the carriage in a reverse direction, a margin stop mounted on the carriage and movable therewith, a cooperating stop on the frame of the machine engageable by said margin stop when the carriage reaches the limit of its movement under the action of said key controlled means, and a device arranged in the path of said margin stop for rendering said key controlled means inoperative.

2. In a typewriting machine, the combination of a frame, a carriage movable transversely on the frame, means for moving the carriage for letter spacing, a power driven roller, key controlled means operated by the power driven roller for moving the carriage in a reverse direction, a margin stop mounted on the carriage, a cooperating stop on the frame of the machine engageable by said margin stop when the carriage reaches the limit of its movement under the action of said key controlled means, a cam device arranged in the path of said margin stop, and means connecting said cam device with said key controlled means for rendering the latter inoperative when the margin stop engages said cam device.

3. In a typewriting machine, the combination of a frame, a carriage movable transversely on the frame, means for moving the carriage for letter spacing, a power driven roller, key controlled means operated by the power driven roller for moving the carriage in a reverse direction, a margin stop mounted on the carriage, a cooperating stop on the frame of the machine engageable by said margin stop when the carriage reaches the limit of its movement under the action of said key controlled means, a trip lever arranged in the path of said margin stop and pivoted on the frame, and means operatively connected with said trip lever for rendering said key controlled means inoperative when the trip lever is actuated by the margin stop.

4. In a typewriting machine, the combination of a frame, a carriage movable transversely on the frame, means for moving the carriage for letter spacing, a power driven roller, means actuated by said power driven roller for moving the carriage in a reverse direction, key controlled devices for operatively connecting the carriage with said power driven roller, a margin stop on the carriage, a stationary stop in the path of said margin stop for limiting the movement of the carriage under the action of said power driven roller, and a cam device in the path of said margin stop for disconnecting the carriage from said power driven roller.

5. In a typewriting machine, the combination of a frame, a carriage movable transversely on the frame, means for moving the carriage for letter spacing, a power driven roller, means actuated by said power driven roller for moving the carriage in a reverse direction, key controlled devices for operatively connecting the carriage with said power driven roller, a margin stop on the carriage, a stationary stop in the path of said margin stop for limiting the movement of the carriage under the action of said power driven roller, a trip lever pivoted on the frame and projecting into the path of said margin stop to be actuated thereby, and devices operatively connecting said trip lever with said power operated roller for disconnecting the carriage from driving connection therewith.

6. In a typewriting machine, the combination of a frame, a carriage movable thereon, means for moving the carriage for letter spacing, a margin stop on the carriage, a stationary stop in the path of the margin stop for limiting the movement of the carriage in a reverse direction, a power driven roller, means operable by said power driven roller for moving the carriage in said reverse direction, key controlled devices for operatively connecting said means with the power driven roller, and means arranged in the path of said margin stop for disconnecting said first mentioned means from operative connection with said power driven roller.

7. In a typewriting machine, the combination of a frame, a carriage movable thereon, means for moving the carriage for letter spacing, a margin stop on the carriage, a stationary stop in the path of the margin stop for limiting the movement of the carriage in a reverse direction, a power driven roller, a device operable by said power driven roller for moving the carriage in said reverse direction, a toggle lever operable to connect or disconnect said device with the power driven roller, key controlled means for moving the toggle lever to connect said device with the power driven roller, and means actuated by the margin stop for moving the toggle lever to disconnect said device from the power driven roller.

8. In a typewriting machine, the combination of a frame, a carriage movable thereon, means for moving the carriage for letter spacing, a margin stop on the carriage, a stationary stop in the path of the margin stop for limiting the movement of the carriage in a reverse direction, a power driven roller, a device operable by said power driven roller for moving the carriage in said reverse direction, a toggle lever operable to connect said device with or disconnect it from the power driven roller, key controlled means for moving the toggle lever to connect said device with the power driven roller, a lever engaging said toggle lever and operable to move it in a reverse direction to disconnect said device from the power driven roller, and means actuated by said margin stop for operating said lever.

9. In a typewriting machine, the combination of a frame, a carriage movable thereon, resilient means for moving the carriage for letter spacing, key controlled means for moving the carriage in the reverse direction against the action of said resilient means, a margin stop on the carriage, a stationary stop cooperating therewith to limit the movement of the carriage by said key controlled means, and means actuated by the movement of the carriage under the action of said key controlled means for rendering said key controlled means inoperative to move the carriage, the construction being such that the key controlled means is rendered inoperative when the margin and stationary stops are separated a predetermined distance and the resilient means operates to reduce the momentum of the carriage as the margin stop moves toward the stationary stop.

10. In a typewriting machine, the combination of a frame, a carriage movable thereon, means for moving the carriage for letter spacing, a power driven roller, key controlled means operated by the power driven roller for moving the carriage in the reverse direction, a margin stop on the carriage, a stationary stop cooperating therewith to limit the movement of the carriage under the action of said key controlled means, a lever operable to render said key controlled means inoperative to move the carriage, an arm on said lever movable into the path of movement of said margin stop, and a cam on said arm engageable by the margin stop to operate the lever.

11. In a typewriting machine, the combination of a frame, a carriage movable transversely on the frame for letter spacing, escapement devices for controlling the letter-space movement of the carriage, key controlled means for returning the carriage to begin a new line, and means actuated automatically by said key controlled means for withdrawing the escapement devices from the carriage while the carriage is being returned to begin a new line.

12. In a typewriting machine, the combination of a frame, a carriage movable transversely on the frame, means for moving the carriage for letter spacing, escapement devices for controlling the movement of the carriage for letter spacing, key controlled means for returning the carriage to begin a new line, a stop for stopping the return movement of the carriage, means actuated by said key controlled means for withdrawing the escapement devices from the carriage, and means actuated by said stop for reengaging the escapement devices with the carriage.

13. In a typewriting machine, the combination of a frame, a carriage movable transversely on the frame, means for moving the carriage for letter spacing, escapement devices comprising a pawl and ratchet for controlling the movement of the carriage for letter spacing, key controlled means for returning the carriage to begin a new line, means actuated by said key controlled means for disengaging the pawl and ratchet while the carriage is being returned, and means actuated automatically by the movement of the carriage for controlling the reengagement of the pawl and ratchet.

14. In a typewriting machine, the combination of a frame, a carriage movable transversely on the frame, means for moving the carriage for letter spacing, escapement devices comprising a pawl and ratchet for controlling the movement of the carriage for letter spacing, power actuated means for returning the carriage to begin a new line, key controlled means for operatively connecting the carriage with said power actuated means, means actuated by said key controlled means for disengaging the pawl from the ratchet, and means actuated automatically by the movement of the carriage for reengaging the pawl with the ratchet.

15. In a typewriting machine, the combination of a frame, a carriage movable transversely on the frame, means for moving the carriage for letter spacing, escapement devices comprising a pawl and ratchet for controlling the movement of the carriage for letter spacing, power actuated means for returning the carriage to begin a new line, key controlled means for operatively connecting the carriage with said power actuated means, means on the carriage for disconnecting the carriage from said power actuated means, a device actuated by said key controlled means for disengaging the pawl from its ratchet, and means for reengaging the pawl with the ratchet when the carriage is disconnected from the power actuated means.

16. In a typewriting machine, the combination of a frame, a carriage movable transversely on the frame, means for moving the carriage for letter spacing, escapement devices comprising a pawl and ratchet for controlling the movement of the carriage for letter spacing, power actuated means for returning the carriage to begin a new line, key controlled means for operatively connecting the carriage with said power actuated means, a lever for disconnecting the carriage from said power actuated means, means operatively connected with said key controlled means for disengaging the pawl from the ratchet when the carriage is connected with the power actuated means, means on the carriage for automatically actuating said lever, and means controlled by said lever for reengaging the pawl with the ratchet.

17. In a typewriting machine, the combination of a frame, a carriage movable transversely on the frame, means for moving the carriage for letter spacing, escapement devices comprising a pawl and ratchet for controlling the movement of the carriage for letter spacing, power actuated means for returning the carriage to begin a new line, key controlled means operatively connecting the carriage with said power actuated means, a stop on the carriage for limiting its movement under the action of said power actuated means, means for disengaging the pawl from the ratchet when the carriage is connected with the power actuated means, and means actuated by said stop for reengaging the pawl with its ratchet.

18. In a typewriting machine, the combination of a frame, a carriage movable transversely thereon for letter spacing, escapement devices comprising a pawl and rack for controlling the movement of the carriage for letter spacing, power actuated means for returning the carriage to begin a new line, key controlled means for operatively connecting the carriage with said power actuated means, means actuated by said key controlled means for disengaging the pawl and rack when the carriage is connected with said power actuated means, a back-spacing pawl, and means for rendering said back-spacing pawl inoperable when the pawl and rack are disengaged.

RUSSELL G. THOMPSON.
CHESTER W. CRUMRINE.